Aug. 22, 1961 E. MERKEL 2,997,097
METHOD OF MAKING AN ENDLESS SEALING RING
Filed May 1, 1958 2 Sheets-Sheet 1
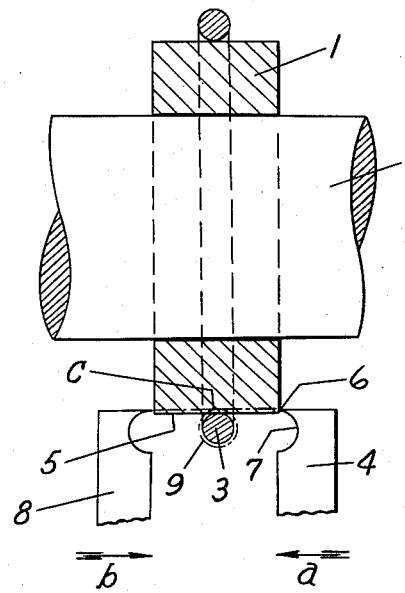
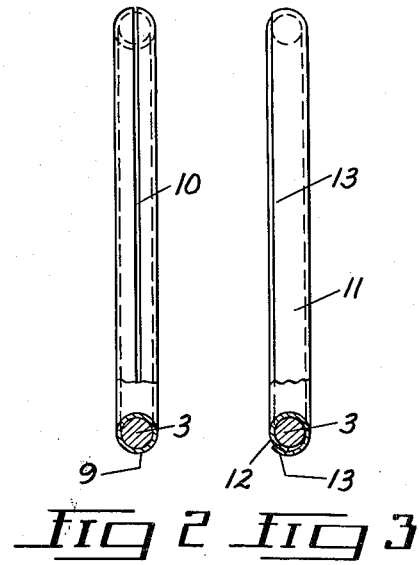
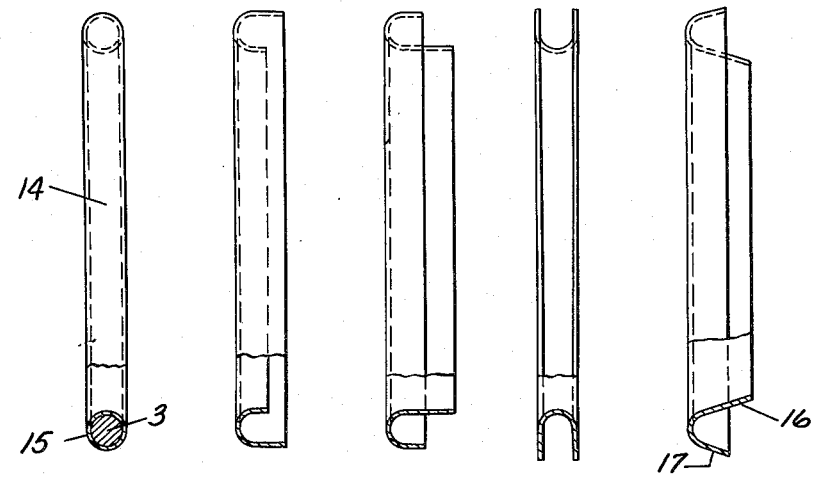
INVENTOR.
Ewald Merkel United States Patent Office 2,997,097
Patented Aug. 22, 1961

2,997,097
METHOD OF MAKING AN ENDLESS
SEALING RING
Ewald Merkel, Wolffssonweg 16, Hamburg 39, Germany
Filed May 1, 1958, Ser. No. 732,221
Claims priority, application Germany Feb. 4, 1958
4 Claims. (Cl. 154—33.1)

The present invention relates to endless sealing rings which comprise a sleeve of synthetic material, especially polytetrafluoroethylene, which surrounds an annular core or hollow chamber.

With heretofore known endless sealing rings of the above mentioned type, the sleeve consists of a hollow ring the cross section of which is shaped in conformity to the core or the hollow chamber, while the outer contour is machined out of the solid. The starting work piece represents a solid ring of rectangular cross section which is machined on a lathe in order to shape the hollow chamber. The outer contour is produced by machining the marginal portions of said rectangular cross section. This method results in a considerable loss of relatively expensive material and requires considerable time and skill. Furthermore, the sleeves have too great a thickness which affects the elastic properties of the ring.

It is, therefore, an object of the present invention to provide a simplified method of producing a sealing ring, which will overcome the above mentioned drawbacks.

It is another object of this invention to provide a method of producing a sealing ring with an annular core and a sleeve surrounding the same, which can be carried out at a considerably lower cost than was heretofore possible with similar sealing rings.

These and other objects and advantages of the invention will appear more clearly from the following specification in connection with the accompanying drawing, in which:

FIG. 1 illustrates the first step in the manufacturing process of a ring according to the present invention.

FIG. 2 shows a sealing ring partly in section and parly in view as made according to the method of the present invention.

FIG. 3 illustrates a sealing ring somewhat modified over that of FIG. 2.

FIG. 4 is a further slight modification of the sealing ring of FIG. 2.

Figure 9:
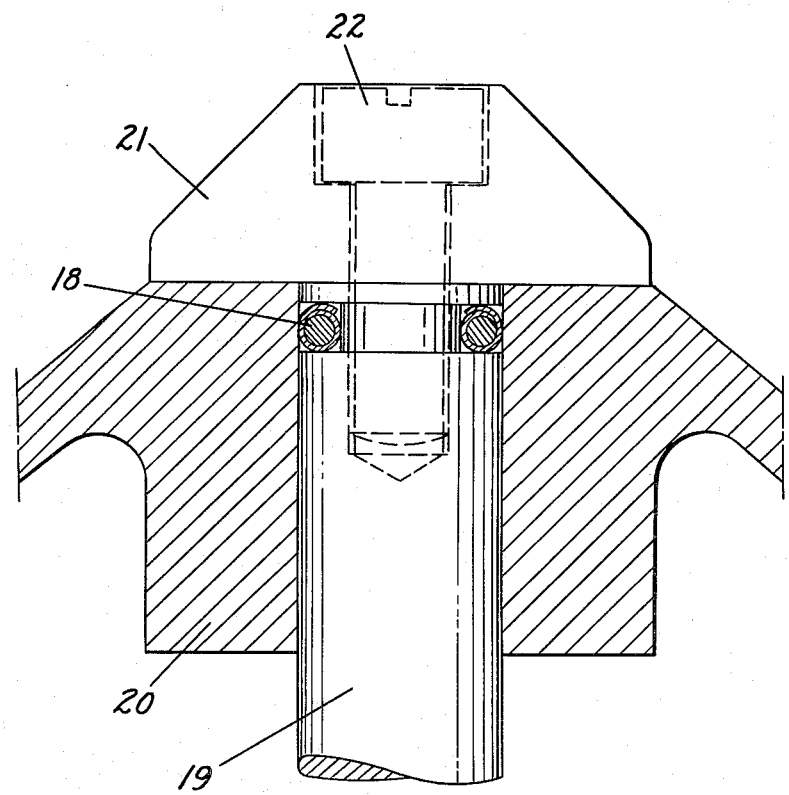

FIGS. 5 to 8 respectively illustrate further sealing rings made according to the method of the present invention, which have a more or less U-shaped cross section in contrast to the circular cross section of the sealing rings of FIGS. 2 to 4.

FIG. 9 illustrates by way of example a sealing ring made according to the method of the present invention and used as a sealing element for a spindle.

*General arrangement*

The sealing ring according to the present invention is characterized primarily in that the annular core or the hollow chamber occupied thereby is surrounded by a sleeve in form of a foil of synthetic material. Due to a bending stress, the said foil is rolled up so as to have an arcuate cross section, while the edges along the circumference of the ring face each other or overlap each other.

The said annular sleeve is in conformity with the present invention produced primarily by turning off from a solid rotary body, especially cylindrical body of a synthetic material, a single piece endless chip and rolling the same over a ring surrounding the work piece. To this end, a turning tool is employed the cutting portion of which has adjacent thereto a fillet of a contour corresponding to the curvature of rolling so that the chip turned off from the work piece will when moving into the fillet during the tool feed be bent around the core ring. Expediently, the turning and rolling process is effected from both end faces of the work piece toward the center plane thereof.

According to the present invention, it is also possible to take off the chip from a starting work piece which has an outer contour other than a cylindrical contour, for instance a cone-shaped contour, in which instance the feeding movement of the turning tool is adapted to the contour of the work piece.

*Structural arrangement*

The method according to the present invention will best be understood in connection with the drawing. A solid ring 1 of polytetrafluoroethylene is employed as starting work piece. The said ring 1 is press-fitted on a shaft 2 and is rotated at high speed. Mounted on ring 1 is a ring 3 of solid or elastic material which has substantially circular cross section. By means of a tool 4, a thin chip 5 is machined off the circumferential surface of ring 1, the tip 6 of the tool entering a side face of ring 1. The chip 5 being machined off from ring 1 will during the feeding of the tool 4 in the direction of the arrow a enter a groove 7 and move therein. The groove 7 adjacent the cutting edge 6 of the tool has a curvature which corresponds substantially to the curvature of the cross section of ring 3. Thus, the chip section machined off by the tool 4, 6 will be rolled during the tool feed and will be placed on the circumferential portion of ring 3 as soon as the cutting edge 6 approaches the point c. Due to this way of chip removal and chip guiding, an elastic deformation is obtained in the cross section of the chip which deformation tends to hold the chip on ring 3 in contact therewith. Subsequently, the removal of chip 5 from the other side of ring 1 and the deformation of chip 5 will be effected in the same manner as described above by means of a tool 8 arranged symmetrically to tool 4. Thus, chip 5 will have the shape of a cover 9 indicated by a dot-dash line and elastically surrounding the core or ring 3.

FIG. 2 illustrates a finished sealing ring according to the invention partly in cross section and partly in view. The cover 9 surrounds the core 3 while being in elastic contact therewith. The two ends of sleeve 9 which face each other nearly abut each other and form a gap 10 therebetween the width of which is determined by the width of ring 1 and the length of the chip 5 with regard to the circumference of ring 3. This relationship may also be so selected that, as shown partly in cross section and partly in view in FIG. 3, the two longitudinal edges 12 and 13 of sleeve 11 will overlap each other.

By displacing point c of FIG. 1 toward the left or toward the right along the cutting off line of chip 5, the right-hand cross sectional portion of the cover along its circumferential length may be increased with regard to the left cross sectional portion or vice versa, and the gap of the cover may accordingly be varied along the circumference of ring 3 as shown for instance in FIG. 4 partly in cross section and partly in view. According to FIG. 4 the gap 15 extends along one end face of cover 14. Similarly, also the overlapping portion of the longitudinal edges 12, 13 of the ring (FIG. 3) may be arranged at a lateral portion of the annular cross section which lateral portion corresponds as to its position for instance to the gap 15 in FIG. 4. The method according to the invention also makes it possible to provide sealing rings with annular cross sections other than those shown in FIGS. 1 to 4. This is particularly the case for open U-shaped cross sections as illustrated for instance in some of the examples in FIGS. 5 to 8. The cutting off of the chip and its bending over around a core ring is effected primarily in the same manner as described above but with the employment of such tools which are shaped in conformity with the cross sectional contour. Similarly, according to the present invention, such U-shaped cross sections may also be produced in a shape in which the legs extend transversely or rectangularly to the feeding direction $a$ and $b$ respectively (FIG. 1) as is illustrated for instance in FIG. 7.

FIG. 8 shows a ring made according to the present invention which has a V-shaped profile with a lateral opening. The leg 16 extending in an inclined manner is cut off from the ring-shaped work piece 1 parallel to the axis of rotation, i.e. in the direction $a$ (FIG. 1) whereupon it is bent into its inclined position. The same applies for the manufacture and shaping of the leg 17.

The core ring 3 (FIGS. 1 to 4) has in conformity with the present invention a double purpose:

When the ring is being manufactured, the core ring 3 forms in each instance a core around which chip 5 after being cut off is bent, the ring forming so to speak a mandrel. Furthermore, as illustrated by the embodiments of FIGS. 1 to 4, the ring may remain in cover 9 as insert and thus may form a component of the sealing ring. However, the present invention also covers an embodiment in which the core ring is used for manufacturing purposes only namely to serve as core or mandrel and will be removed from the finished cover in order to provide a hollow chamber therein. Such an embodiment is shown, for instance in FIGS. 5 and 8 which shows cuff-like sealing rings. Furthermore, the sealing rings according to FIGS. 1 to 4 need not have a ring 3 as insert, inasmuch as the elasticity of sleeve 9 makes it possible to remove ring 3 after the completion of said sealing rings.

It is, of course, to be understood that the present invention is, by no means, limited to the particular constructions shown in the drawings but also comprises any modifications within the scope of the appended claims.

FIG. 9 shows a sealing ring 18 made according to the present invention (especially according to FIG. 3) used as a sealing element in connection with a spindle 19 arranged in a frame 20. The ring 18 is inserted in a sealing space formed between the front of the spindle 19 and a cover 21 and is secured to frame 20 and spindle 19 by means of a screw 22.

While in the preceding specification only one synthetic material has been named, it is to be understood that the said specific synthetic material has been named as example only and that other synthetic materials may be used for the sealing ring according to the invention. Thus, for instance the following synthetic materials may be used: polymers of trifluoromonochlorethylene or copolymers of hexafluoropropylene with vinylidefluoride.

Generally, all synthetic materials known under the collective name of polymers of halogencarbons may be employed for the purpose of the present invention.

What I claim is:

1. A method of making an endless sealing ring, which includes the steps of: placing a ring member about an annular body from which the sealing ring is to be produced, rotating said body, and cutting off from the surface of said body an endless chip while gradually curling the cut-off chip about said ring member.

2. A method of making an endless synthetic sealing ring, which includes the steps of: placing a ring member about an annular body of synthetic material from which the sealing ring is to be produced, rotating said body, cutting off from surface of said body an endless chip by means of a cutting tool having a fillet, and during the cutting off of said endless chip curling the cut-off chip around said ring member.

3. A method of making an endless sealing ring, which includes the steps of: placing a ring member about an annular body from which the sealing ring is to be produced, rotating said body, and simultaneously in opposite directions cutting off from the surface of said body an endless chip while gradually curling the cut-off chip about said ring member.

4. A method of making an endless sealing ring, which includes the steps of: placing a ring member about an annular body from which the sealing ring is to be produced, said ring member being placed asymmetrically on said body, rotating said body, and simultaneously in opposite directions respectively cutting off from the surface of said body an endless chip portion while gradually curling the cut-off chip portions toward each other around said ring member.

References Cited in the file of this patent

UNITED STATES PATENTS

| | | |
|---|---|---|
| 2,041,565 | Miller | May 19, 1936 |
| 2,138,568 | Brandenberger | Nov. 29, 1938 |
| 2,406,127 | Alfthan | Aug. 20, 1946 |
| 2,491,528 | Spinner | Dec. 20, 1949 |
| 2,593,514 | Albrecht et al. | Apr. 22, 1952 |
| 2,717,023 | Hetherington | Sept. 6, 1955 |
| 2,717,025 | Jelinek | Sept. 6, 1955 |
| 2,755,118 | Jarvis | July 17, 1956 |
| 2,781,552 | Gray | Feb. 19, 1957 |